Jan. 12, 1971  G. OHAYON  3,555,536
YARN RUPTURE DETECTOR
Filed Dec. 18, 1967
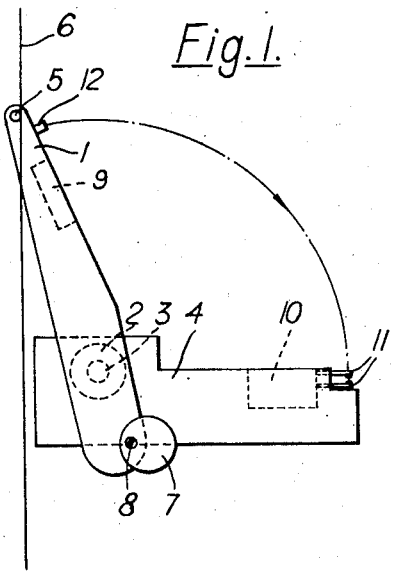
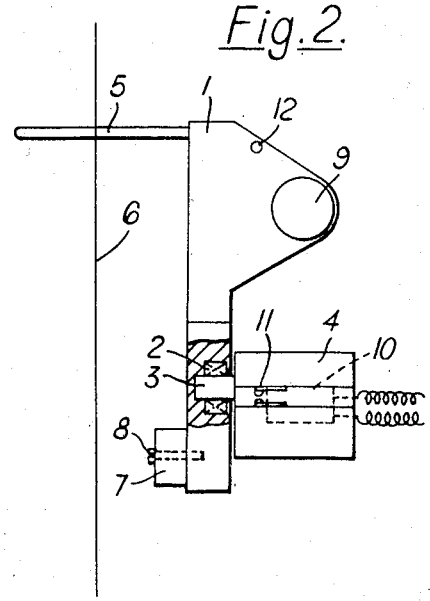
Inventor
Gabriel Ohayon
By Cushman, Darby & Cushman
Attorneys

United States Patent Office 3,555,536
Patented Jan. 12, 1971

3,555,536
YARN RUPTURE DETECTOR
Gabriel Ohayon, Rhone, France, assignor to
Societe Rhodiaceta
Filed Dec. 18, 1967, Ser. No. 691,543
Claims priority, application France, Dec. 21, 1966,
88,385
Int. Cl. B65h 25/14; G08b 21/00
U.S. Cl. 340—259                                    4 Claims

ABSTRACT OF THE DISCLOSURE

A yarn rupture detector for use in a textile machine in which a lever carries a sensing arm which bears on the running yarn. The lever is urged from the detecting position towards an alarm position by a first force which decreases as the lever moves towards the alarm position. If the yarn ruptures, the lever moves beyond an equilibrium position and a magnetic force takes over to move the lever firmly to the alarm position.

---

The present invention relates to a device for detecting yarn ruptures, utilisable notably on textile machines.

It is the function of a device of this kind to react automatically on rupture of the yarn or yarns which it monitors and to trip the operation of an appropriate alarm device for indication or intervention.

Detectors are known which consist of a lever rocking about a pivot and provided with a sensing means applied against the yarn under the action of a force which, on rupture of the said yarn, pivots the lever into a so-called alarm position wherein the lever trips an appropriate device. Such detectors are simple but are unsuitable for the monitoring of fine and only slightly tensioned yarns wherein the restoring force on the lever must be of the order of magnitude of 1 gramme and, advantageously, should be as small as possible. This force permits the triggering of only extremely sensitive alarm devices which are fragile and costly. Furthermore, the response time of such detectors is long and the response may even be suspect, since a weak force will suffice to disturb the movement of the lever.

In order to palliate these disadvantages, detectors have been designed wherein the energy communicated to the lever on rupture is amplified by the application of a very much stronger force to the lever as it rocks towards the alarm position. The said lever is thus able to act in an extremely reliable manner on a simplified alarm device.

However, the various designs hitherto known do not give entirely satisfactory results. The employment of tensioned springs, the detensioning of which is triggered during the movement of the lever makes for delicate mechanical devices and complicates the re-cocking of the detector after each triggering operation.

The utilisation of a magnetic force has resulted in apparatus wherein the re-cocking of the detector is greatly simplified. However, the functioning of those magnetic devices which have hitherto been known is uncertain when highly sensitive detection is necessary. Furthermore, the adjustment of the recall force of the detector on the yarn, frequently achieved by inclination of the device, is not very precise and makes the working of textile machines equipped with a large number of these devices an extremely delicate matter.

It is the object of the present invention to provide a yarn rupture detector of high sensitivity and which simultaneously functions reliably.

According to the invention, there is provided a yarn rupture detector comprising a lever rockable about a pivot between a yarn detecting position and an alarm position, sensing means on said lever adapted to contact a yarn in the yarn detecting position, means for applying a first force to urge said lever from said detecting position towards the alarm position, said force decreasing as said lever pivots towards said alarm position, magnetic means urging said lever toward said alarm position, the force applied by said magnetic means being negligible at said detecting position, said magnetic means and force applying means being so related that the lever may be held in static equilibrium at a position between said detecting position and alarm position, said magnetic means becoming preponderant when said lever is located on the alarm position side of said equilibrium position, and an alarm actuated by said lever when in said alarm position.

The detector lever is capable of pivoting about a pivot and of occupying a detection position wherein it contacts the yarn to be monitored, an alarm position wherein it is adapted to actuate an appropriate alarm device, and at least one position of equilibrium located between the preceding positions and wherein it is not subjected to any force tending to rock it in either direction.

Depending on the combination of the two forces mentioned above, there may be one or more adjacent positions of equilibrium or one zone of equilibrium. Preferably, the distance between the various positions of equilibrium, or the length of the zone of equilibrium, will be diminished in such manner that the reaction time of the detector is as brief as possible and, in order to simplify the discussion, mention will be made, in the following text, of only one position of equilibrium. The position of equilibrium is preferably near the detection position, located on the side opposite the latter relatively to the path of the yarn, so that the position of equilibrium is not normally reached by the lever save in the event of absence or rupture of the yarn.

The magnetic force is negligible in the detection position, so that in that position the lever is subjected only to the first force, which is the resultant orthogonal to its axis of rotation of all the forces, except the magnetic force, exerted on it.

The first force may thus comprise components of forces set up by a device or a combination of devices, forces produced by weights, magnetic repulsion devices, springs, counterweights, gas jets, or by friction, inertia or air resistance forces. In practice, this latter category of forces is, advantageously, rendered negligible by means of arrangements which are generally well known.

The magnetic force becomes, beyond the position of equilibrium, preponderant over the first force and thus over the component orthogonal to the axis of rotation of all the other forces to which the lever is then subjected.

In the vicinity of the detection position, the first force decreases, preferably uniformly, into the position of equilibrium. This decrease permits the rapid return of the lever into the detection position when the latter is deflected therefrom under the influence of vibrations in the yarn or in the machine.

Furthermore, if this decrease is uniform, the distance between the detection position and the position of equilibrium in a simple function of the magnitude of the first force in the detection position. Now, the position of equilibrium may readily be shown in the absence of yarn by immobilisation of the lever in that position. Thus, the adjustment of the detector is readily achieved.

Between the equilibrium position and of course, in the case of a plurality of positions, between the last position of equilibrium through which the lever has passed during its rocking movement towards the alarm position, and the alarm position, the magnetic force becomes much stronger than the first force and the lever is accelerated very vigorously until it reaches the alarm position, wherein the force which it is able to develop enables it to trip the appropriate alarm device.

The alarm device may be tripped directly by the lever. This is so for example in the case of an alarm bell, a visual-signal disc, etc. It may also be tripped by a mechanical, electrical or pneumatic relay, which is triggered by the lever.

The invention will be more readily understood from the following description, given purely by way of example, reference being made to the accompanying drawings, in which:

FIG. 1 is a front elevation of one embodiment of detector according to the invention illustrated in the detecting position; and FIG. 2 is a side elevation of the detector of FIG. 1.

According to FIGS. 1 and 2, the device comprises a lever 1, mounted for free rotation by means of ball-bearings 2 on a horizontal pivot 3 secured on the support 4, which is carried by the frame (not shown) of a textile machine. The lever 1 is provided at one of its ends with a sensing arm 5 which normally contacts the yarn 6, under the action of a force which is produced by a counterweight 7, the position of which can be adjusted by rotating about a screw 8 upon which it is eccentrically mounted. A magnetic device is constituted by two small magnetic pieces 9 and 10 integral with the lever 1 and the support 4 respectively, the magnetic force set up between them being negligible when the lever is in the vicinity of the detection position. The pieces 9 and 10 are so located that when the lever rocks in a clockwise direction, as viewed in FIG. 2, to an alarm position the two magnets are attracted towards one another and finally are in contact. The lever 1 is furthermore provided with a stop or abutment 12 which, when the lever is in the alarm position, closes an electric contact 11 connected in an alarm circuit (not shown).

In the event of rupture of the yarn 6, the lever 1 rocks under the influence of the counterweight and its velocity increases whereas the moment of the weight decreases to nothing and increases in the opposite sense i.e. it opposes the magnetic attraction force of the masses 9 and 10. However, in absolute value, the moment of the magnetic force increases more rapidly than the moment of the weight, so that a point of equilibrium is reached beyond which the magnetic force is preponderant. The lever passes through the point of equilibrium due to the velocity acquired and is then re-accelerated into the alarm position, wherein it closes the contact 11.

The device described hereinabove permits regulation or adjustment of the force for restoring the lever into a detection position between 0 and 10 gms., and monitoring by immobilisation in the position of equilibrium permits a degree of precision attaining 0.1 gm. for low sensitivities.

The magnetic device makes it possible for the forces on the lever, at the end of its travel of the lever, to be of the order of 100 grammes, so that it becomes possible to achieve extremely reliable functioning of the electric contact 11 or of practically any other known alarm device.

I claim:

1. A yarn rupture detector for use in a textile machine, said detector comprising, in combination:
    (a) pivot means;
    (b) a lever pivotable about said pivot means between a yarn detecting position and an alarm position;
    (c) alarm means actuated by said lever when in said alarm position;
    (d) means for applying a first force, effective to urge said lever from said detecting position towards said alarm position, said first force decreasing as said lever moves towards said alarm position;
    (e) magnetic force applying means urging said lever towards said alarm position, the force applied thereby when said lever is in said detecting position being negligible, the force applied by said magnetic force applying means and said first force applying means being so related that said lever may be held in static equilibrium at a position between said detecting position and alarm position, said magnetic force applying means become preponderant over said first force applying means when said lever is located on the alarm position side of said equilibrium position; and
    (f) yarn sensing means on said lever effecting to contact a yarn when in said yarn detecting position.

2. A detector as claimed in claim 1, wherein said pivot means is a horizontal pivot.

3. A detector as claimed in claim 2, wherein said first force applying means comprises a counterweight carried by said lever.

4. A detector as claimed in claim 3, further comprising adjustment means effective to adjust the position of said counterweight.

References Cited

UNITED STATES PATENTS

| 2,281,188 | 4/1942 | White | 340—259UX |
| 3,253,269 | 5/1966 | Ratti | 340—259 |
| 3,257,518 | 6/1966 | Vosser | 200—61.18 |

FOREIGN PATENTS

| 542,738 | 9/1956 | Germany | 200—67F |

ALVIN H. WARING, Primary Examiner

P. PALAN, Assistant Examiner

U.S. Cl. X.R.

200—61.18, 67F